United States Patent
Liao

(10) Patent No.: US 9,241,154 B2
(45) Date of Patent: Jan. 19, 2016

(54) LIQUID CRYSTAL DISPLAY PANEL AND DISPLAY METHOD COMPATIBLE WITH 2D AND 3D DISPLAY MODE

(71) Applicant: Shenzhen China Star Optoelectronics Technology Co., Ltd., Shenzhen, Guangdong (CN)

(72) Inventor: Zuomin Liao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 167 days.

(21) Appl. No.: 14/347,622

(22) PCT Filed: Jan. 22, 2014

(86) PCT No.: PCT/CN2014/071160
§ 371 (c)(1),
(2) Date: Mar. 26, 2014

(87) PCT Pub. No.: WO2015/096259
PCT Pub. Date: Jul. 2, 2015

(65) Prior Publication Data
US 2015/0189264 A1    Jul. 2, 2015

(30) Foreign Application Priority Data
Dec. 27, 2013  (CN) .......................... 2013 1 0733558

(51) Int. Cl.
G02F 1/1335 (2006.01)
G02F 1/136 (2006.01)
H04N 13/04 (2006.01)
G09G 3/00 (2006.01)
G09G 3/36 (2006.01)

(52) U.S. Cl.
CPC ........... *H04N 13/0454* (2013.01); *G09G 3/003* (2013.01); *G09G 3/3648* (2013.01); *H04N 13/0434* (2013.01); *H04N 13/0452* (2013.01); *G09G 2300/0426* (2013.01); *G09G 2300/0895* (2013.01)

(58) Field of Classification Search
CPC ... H04N 13/0454; G09G 3/3648; G09G 3/36; G09G 2300/0426; G02F 1/13624
USPC ........................ 349/15, 43, 48; 348/51, 55–58
See application file for complete search history.

(56) References Cited

U.S. PATENT DOCUMENTS

| | | | |
|---|---|---|---|
| 2008/0303768 A1* | 12/2008 | Do ....................... | G09G 3/3659 345/90 |
| 2014/0035968 A1* | 2/2014 | Chen ....................... | G09G 5/02 345/691 |

\* cited by examiner

*Primary Examiner* — Nathanael R Briggs
(74) *Attorney, Agent, or Firm* — Andrew C. Cheng

(57) ABSTRACT

The present invention provides an LCD panel and a display method compatible with a 2D and a 3D display mode. The 3D display mode comprises a shutter 3D and a polarized 3D display mode. The LCD panel comprises multiple pixels, and each pixel comprises: a substrate, a data line, scan line, a common electrode line, 2D/3D switching control signal line, and a pixel unit. The pixel unit comprises: a first to a fourth switching elements, a first pixel electrode, and a second pixel electrode. The present invention, through disposing a 2D/3D switching control signal line to achieve switching of every operation mode, improve the color shift issue at the large viewing angle, increase aperture ratio, and reduce energy consumption at the same time.

14 Claims, 3 Drawing Sheets

LIQUID CRYSTAL DISPLAY PANEL AND DISPLAY METHOD COMPATIBLE WITH 2D AND 3D DISPLAY MODE

BACKGROUND OF THE INVENTION

1. Field of the Invention

The present invention relates to the technical field of liquid crystal display, and more particularly to a liquid crystal display panel and display method compatible with a 2D and a 3D display mode.

2. Description of Related Art

The liquid crystal display (LCD) device has many advantages of a thin body, energy saving, and no radiation, etc., and has been widely used. Most of the LCD device in the current market is a backlight type LCD device, which includes a liquid crystal panel and a backlight module. The operation principle of the liquid crystal panel is disposing liquid crystal molecules at two parallel glass substrates, and applying a driving voltage on the glass substrates to control the rotation direction of the liquid crystal molecules such that it reflects out the light from the backlight module to generated a picture. Because the liquid crystal panel itself does not emit light, it requires the backlight module to provide a light source to display an image properly. Therefore, the backlight module is one of the key components of the LCD device. According to the light incident position of the light source, the backlight module can be divided into two kinds of the side-light-type backlight module and the direct-light-type backlight module.

The direct-light-type backlight module places the light source such as CCFL (Cold Cathode Fluorescent Lamp) or LED (Light Emitting Diode) to the back of the liquid crystal panel to form a surface light source directly and proving to the liquid crystal panel. The side-light-type backlight module places the LED light bar for the backlight source at an edge of a backplane at the back of the liquid crystal panel. The light emitted from the LED light bar enters into a light guide plate at a light incident surface of the light guide plate. The light is emit out from the light emitting surface of the light guide plate after reflection and diffusion, and passing through an optical film module to form a surface light source and providing to the liquid crystal panel.

With the development of the display technology, the 3D LCD device has become more and more popular. In the current art, it generally uses two methods to achieve the 3D display: one is the polarized (Film-type Patterned Retarder, FPR) 3D technology and the other is the shutter (Shutter Glass, SG) 3D technology.

Wherein, in the polarized 3D display technology, pixels of two adjacent rows correspond to the viewer's left eye and right eye to respectively generate a left-eye image corresponding to the left eye and a right-eye image corresponding to the right eye. After the left eye and the right eye of the viewer receives the corresponding left-eye image and the right-eye image, through the synthesis of left and right-eye images by the brain so that the viewer can feel a 3D display effect. However, the left and right-eye images are easily to generate the crosstalk such that the viewer sees an overlapping image, which affects the viewing effect. In order to avoid the left-eye image signal and the right-eye image signal to generate the crosstalk, it utilizes a mask method of a black matrix (BM) between the pixels of the two adjacent rows to block the crosstalk signal in order to reduce the crosstalk between the left-eye and right-eye image signals.

The shutter 3D technology does not require the mask of the black matrix between the pixels of the two adjacent rows, and it achieves the 3D effect by mainly increasing the refresh rate of the picture. An image is divided into two by frame to form the corresponding left-eye and right-eye pictures, and they are displayed continuously and alternately, and an infrared signal transmitter will synchronize 3D TV to control the switching of the left and right lens of the shutter 3D glasses such that the left and right eyes can see the corresponding pictures at the right moment.

SUMMARY OF THE INVENTION

An object of the present invention is to provide an LCD panel compatible with a 2D and a 3D display mode. Through disposing a 2D/3D switching control signal line to achieve switching of every operation mode, it can be compatible with the 2D display mode, a shutter 3D display mode, and a polarized 3D display mode to improve the color shift issue at the large viewing angle, and increase aperture ratio, reduce energy consumption, decreasing the development cost at the same time.

An object of the present invention is to provide a display method compatible with a 2D and a 3D display mode. The method is easily to operate, and it can be compatible with the 2D display mode, a shutter 3D display mode, and a polarized 3D display mode to improve the color shift issue at the large viewing angle, and increase aperture ratio, reduce energy consumption, decreasing the development cost at the same time.

To achieve the above objects, the present invention provides: a liquid crystal display (LCD) panel compatible with a 2D and a 3D display mode, the operation mode of the LCD panel comprising the 2D display mode and the 3D display mode, the 3D display mode comprising a shutter 3D display mode and a polarized 3D display mode, the LCD panel comprising multiple pixels, each pixel comprising: a substrate; a data line disposed on the substrate; a scan line disposed on the substrate; a common electrode line disposed on the substrate; a 2D/3D switching control signal line disposed on the substrate; and a pixel unit, comprising: a first switching element; a second switching element; a third switching element; a fourth switching element; a first pixel electrode; and a second pixel electrode disposed in parallel with the first pixel electrode, wherein, the first switching element electrically connects to the scan line, the data line, the second switching element, and the second pixel electrode respectively; the second switching element electrically connects to the scan line, the first switching element, the first pixel electrode, the second pixel electrode, and the third switching element respectively; the third switching element electrically connects to the scan line, the second switching element, the first pixel electrode, the fourth switching element, and the common electrode line respectively; the fourth switching element electrically connects to the 2D/3D switching control signal line, the second pixel electrode, the third switching element, and the common electrode line respectively.

Wherein, when operation mode of the LCD panel compatible with the 2D and 3D display mode is under the 2D display mode, a refresh rate of the LCD panel compatible with the 2D and 3D display mode is 60 HZ, and a signal on the 2D/3D switching control signal line is constantly a low voltage; when the operation mode of the LCD panel compatible with the 2D and 3D display mode is under the shutter 3D display mode, the refresh rate of the LCD panel compatible with the 2D and 3D display mode is 120 HZ, and each of the pixels alternately displays a left-eye frame data and a right-eye frame data, and a signal on the 2D/3D switching control signal line is constantly a low voltage; when the operation mode of the LCD panel compatible with the 2D and 3D display mode is under the polarized 3D display mode, the refresh rate of the LCD panel compatible with the 2D and 3D display mode is 120 HZ, and a signal on the 2D/3D switching control signal line is a square wave with a high and low voltage such that the fourth switching element pulls down a voltage on the second pixel electrode to make a location at the second pixel electrode display a black color to provide a mask function.

Wherein, the first switching element has a first control terminal, a first input terminal and a first output terminal and the first control terminal electrically connects to the scan line, the first input terminal electrically connects to the data line, first output terminal electrically connects to the second switching element and the second pixel electrode respectively; the second switching element has a second control terminal, a second input terminal and a second output terminal, the second control terminal electrically connects to the scan line, the second input terminal electrically connects to the first output terminal and the second pixel electrode respectively, the second output terminal electrically connects the second output terminal and the first pixel electrode, and the third switching element respectively; the third switching element has a third control terminal, a third input terminal and a third output terminal, the third control terminal electrically connects to the scan line, the third input terminal electrically connects to the second output terminal and the first pixel electrode respectively, the third output terminal electrically connected to the fourth switching element and the common electrode line respectively; the fourth switching element has a fourth control terminal, a fourth input terminal and a fourth output terminal, the fourth control terminal electrically connects to the 2D/3D switching control signal line, the fourth input terminal electrically connects the second pixel electrode, the fourth output terminal electrically connects to the third output terminal and the common electrode line respectively.

Wherein, the first to the fourth switching elements are respectively a first to a fourth thin-film transistors; the first thin film transistor has a first gate electrode, a first source electrode and a first drain electrode; the second thin-film transistor has a second gate electrode, a second source electrode and a second drain electrode; the third thin film transistor has a third gate electrode, a third source electrode and a third drain electrode; the fourth thin film transistor has a fourth gate electrode, a fourth source electrode and a fourth drain electrode; the first to the fourth control terminals are respectively the first to the fourth gate electrodes; the first to the fourth input terminals are respectively the first to the fourth source electrodes; the first to the fourth output terminal are respectively the first to the fourth drain electrodes.

Wherein, the LCD panel compatible with the 2D and the 3D display mode utilizes an 8-domains design.

The present invention also provides: a liquid crystal display (LCD) panel compatible with a 2D and a 3D display mode, the operation mode of the LCD panel comprising the 2D display mode and the 3D display mode, the 3D display mode comprising a shutter 3D display mode and a polarized 3D display mode, the LCD panel comprising multiple pixels, each pixel comprising: a substrate; a data line disposed on the substrate; a scan line disposed on the substrate; a common electrode line disposed on the substrate; a 2D/3D switching control signal line disposed on the substrate; and a pixel unit, comprising: a first switching element; a second switching element; a third switching element; a fourth switching element; a first pixel electrode; and a second pixel electrode disposed in parallel with the first pixel electrode, wherein, the first switching element electrically connects to the scan line, the data line, the second switching element, and the second pixel electrode respectively; the second switching element electrically connects to the scan line, the first switching element, the first pixel electrode, the second pixel electrode, and the third switching element respectively; the third switching element electrically connects to the scan line, the second switching element, the first pixel electrode, the fourth switching element, and the common electrode line respectively; the fourth switching element electrically connects to the 2D/3D switching control signal line, the second pixel electrode, the third switching element, and the common electrode line respectively;

when operation mode of the LCD panel compatible with the 2D and 3D display mode is under the 2D display mode, a refresh rate of the LCD panel compatible with the 2D and 3D display mode is 60 HZ, and a signal on the 2D/3D switching control signal line is constantly a low voltage;

when the operation mode of the LCD panel compatible with the 2D and 3D display mode is under the shutter 3D display mode, the refresh rate of the LCD panel compatible with the 2D and 3D display mode is 120 HZ, and each of the pixels alternately displays a left-eye frame data and a right-eye frame data, and a signal on the 2D/3D switching control signal line is constantly a low voltage;

when the operation mode of the LCD panel compatible with the 2D and 3D display mode is under the polarized 3D display mode, the refresh rate of the LCD panel compatible with the 2D and 3D display mode is 120 HZ, and a signal on the 2D/3D switching control signal line is a square wave with a high and low voltage such that the fourth switching element pulls down a voltage on the second pixel electrode to make a location at the second pixel electrode display a black color to provide a mask function.

Wherein, the first switching element has a first control terminal, a first input terminal and a first output terminal and the first control terminal electrically connects to the scan line, the first input terminal electrically connects to the data line, first output terminal electrically connects to the second switching element and the second pixel electrode respectively; the second switching element has a second control terminal, a second input terminal and a second output terminal, the second control terminal electrically connects to the scan line, the second input terminal electrically connects to the first output terminal and the second pixel electrode respectively, the second output terminal electrically connects the second output terminal and the first pixel electrode, and the third switching element respectively; the third switching element has a third control terminal, a third input terminal and a third output terminal, the third control terminal electrically connects to the scan line, the third input terminal electrically connects to the second output terminal and the first pixel electrode respectively, the third output terminal electrically connected to the fourth switching element and the common electrode line respectively; the fourth switching element has a fourth control terminal, a fourth input terminal and a fourth output terminal, the fourth control terminal electrically connects to the 2D/3D switching control signal line, the fourth input terminal electrically connects the second pixel electrode, the fourth output terminal electrically connects to the third output terminal and the common electrode line respectively.

Wherein, the first to the fourth switching elements are respectively a first to a fourth thin-film transistors; the first thin film transistor has a first gate electrode, a first source electrode and a first drain electrode; the second thin-film transistor has a second gate electrode, a second source electrode and a second drain electrode; the third thin film transistor has a third gate electrode, a third source electrode and a third drain electrode; the fourth thin film transistor has a fourth gate electrode, a fourth source electrode and a fourth drain electrode; the first to the fourth control terminals are respectively the first to the fourth gate electrodes; the first to the fourth input terminals are respectively the first to the fourth source electrodes; the first to the fourth output terminal are respectively the first to the fourth drain electrodes.

Wherein, the LCD panel compatible with the 2D and the 3D display mode utilizes an 8-domains design.

The present invention also provides: a display method compatible with a 2D and a 3D display mode, comprising steps of:

step1: providing an LCD panel compatible with the 2D and the 3D display mode, wherein, an operation mode of the LCD panel includes the 2D display mode and the 3D display mode; the 3D display mode includes a shutter 3D display mode and a polarized 3D display mode; the LCD panel includes multiple pixels; each of the pixels comprises: a data line, a scan line, and a common electrode line; the data line and the scan line define a pixel display region; the pixel display region includes a first display region and a second display region; the first display region includes a first pixel electrode, and the second display region includes a second pixel electrode;

step2: when the operation mode of the LCD panel is under the 2D display mode, a refresh rate of the LCD panel is 60 HZ; a voltage on the first pixel electrode and a voltage on the second pixel electrode are synchronized in the magnitude such that the first and the second display regions synchronously display a same image;

step3: when the operation mode of the LCD panel is under a shutter 3D display mode, the refresh rate of the LCD panel is 120 HZ; a voltage on the first pixel electrode and a voltage on the second pixel electrode are synchronized in the magnitude such that the first and the second display regions synchronously display a same image, and the pixel display region formed by the first and the second display regions alternately displays left-eye and right-eye frame data;

step4: when the operation mode of the LCD panel is under a polarized 3D display mode, the refresh rate of the LCD panel is 120 HZ; the first pixel electrode is charged according to a frame data signal on the data line such that the first display region displays an image; the second pixel electrode is charged according to the frame data signal on the data line, and discharges to the common electrode of the pixel after charged such that the voltage on the second pixel electrode is decreased to turn off the second display region to make the second display region display a black color.

Wherein, each of the pixels further comprises: a substrate, a 2D/3D switching control signal line disposed on the substrate, and a pixel unit; the data line, the scan line and the common electrode line are all disposed on the substrate; the pixel unit includes: a first, a second, a third, a fourth switching elements, a first pixel electrode, and a second pixel electrode disposed in parallel with the first pixel electrode; the first switching element electrically connects to the scan line, the data line, the second switching element, and the second pixel electrode respectively; the second switching element electrically connects to the scan line, the first switching element, the first pixel electrode, the second pixel electrode, and the third switching element respectively; the third switching element electrically connects to the scan line, the second switching element, the first pixel electrode, the fourth switching element, and a common electrode line respectively; the fourth switching element electrically connects to the 2D/3D switching control signal line, the second pixel electrode, the third switching element, and the common electrode line respectively; the first switching element has a first control terminal, a first input terminal and a first output terminal and the first control terminal electrically connects to the scan line, the first input terminal electrically connects to the data line, first output terminal electrically connects to the second switching element and the second pixel electrode respectively; the second switching element has a second control terminal, a second input terminal and a second output terminal, the second control terminal electrically connects to the scan line, the second input terminal electrically connects to the first output terminal and the second pixel electrode respectively, the second output terminal electrically connects the second output terminal and the first pixel electrode, and the third switching element respectively; the third switching element has a third control terminal, a third input terminal and a third output terminal, the third control terminal electrically connects to the scan line, the third input terminal electrically connects to the second output terminal and the first pixel electrode respectively, the third output terminal electrically connected to the fourth switching element and the common electrode line respectively; the fourth switching element has a fourth control terminal, a fourth input terminal and a fourth output terminal, the fourth control terminal electrically connects to the 2D/3D switching control signal line, the fourth input terminal electrically connects the second pixel electrode, the fourth output terminal electrically connects to the third output terminal and the common electrode line respectively.

Wherein, in the step2, a signal on the 2D/3D switching control signal line is constantly a low voltage; in the step3, a signal on the 2D/3D switching control signal line is constantly a low voltage; and in the step4, a signal on the 2D/3D switching control signal line is a square wave with a high and low voltage such that after the second pixel electrode is charged, using the high voltage provided by the 2D/3D switching control signal line to turn on the fourth switching element such that the second pixel electrode discharges to the common electrode line, decreases the voltage on the second pixel electrode to turn off the second display region.

Wherein, the first to the fourth switching elements are respectively a first to a fourth thin-film transistors; the first thin film transistor has a first gate electrode, a first source electrode and a first drain electrode; the second thin-film transistor has a second gate electrode, a second source electrode and a second drain electrode; the third thin film transistor has a third gate electrode, a third source electrode and a third drain electrode; the fourth thin film transistor has a fourth gate electrode, a fourth source electrode and a fourth drain electrode; the first to the fourth control terminals are respectively the first to the fourth gate electrodes; the first to the fourth input terminals are respectively the first to the fourth source electrodes; the first to the fourth output terminal are respectively the first to the fourth drain electrodes.

Wherein, the LCD panel compatible with the 2D and the 3D display mode utilizes an 8-domains design.

The beneficial effects of the invention: the LCD panel and display method compatible with the 2D and 3D display mode of the present invention, through disposing a 2D/3D switching control signal line, and using the high and low voltage on that line to achieve switching of every operation mode. Therefore the present invention can be compatible with the 2D display mode, the shutter 3D display mode, and the polarized 3D display mode. Moreover, the LCD panel compatible with the 2D and 3D display modes utilizes an 8-domains design to improve the color shift issue at the large viewing angle, which has the color shift improvement effect at the large viewing angle. At the same time, the present invention can also increase aperture ratio, reduce energy consumption, and reduce development cost.

DETAILED DESCRIPTION OF THE PREFERRED EMBODIMENT

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

Figure 1:
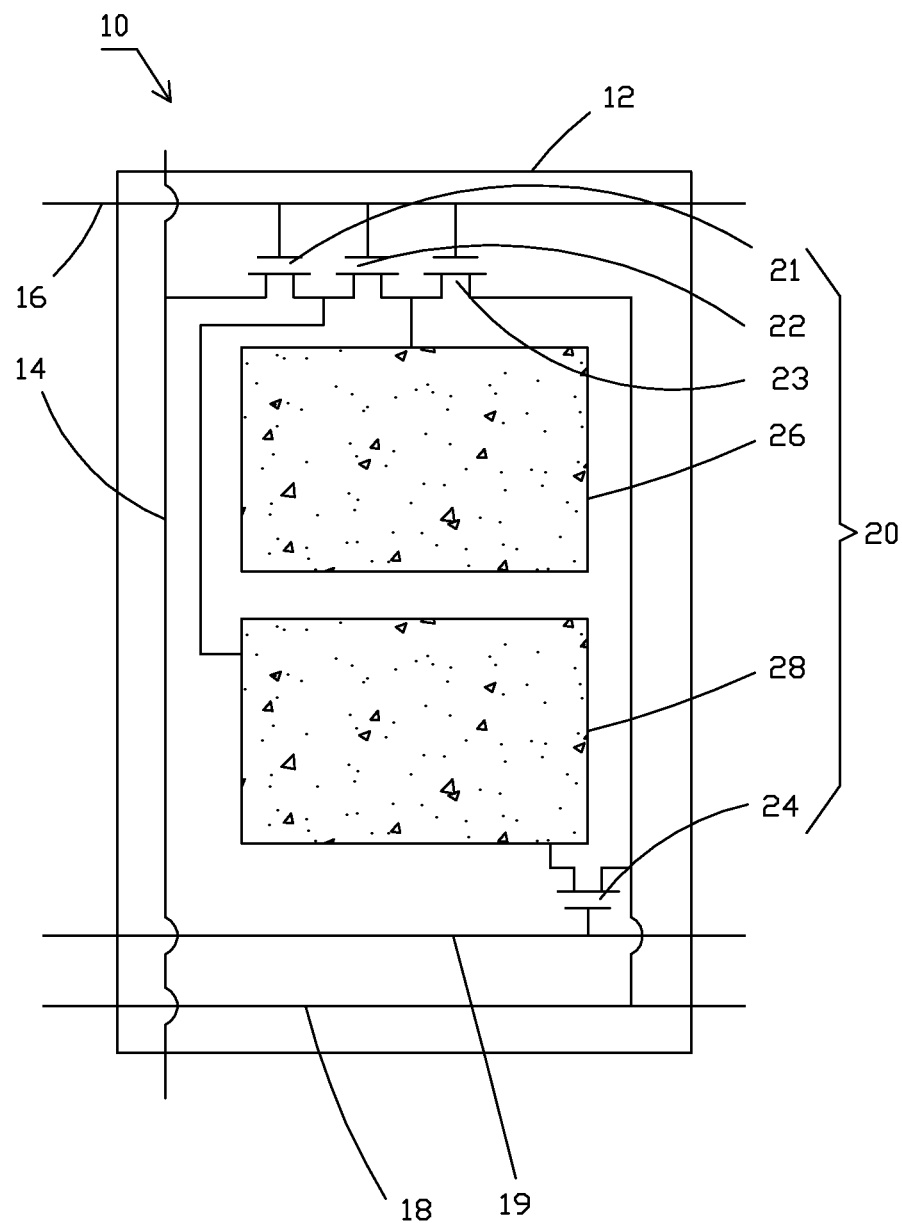
FIG. 1 is a schematic diagram of a pixel structure in an LCD panel compatible with a 2D and a 3D display mode.

With reference to FIG. 1, the present invention provides an LCD panel compatible with a 2D and a 3D display mode, and the operation mode of the LCD panel includes the 2D display mode and the 3D display mode. The 3D display mode includes a shutter 3D display mode and a polarized 3D display mode. The LCD panel includes multiple pixels 10, each of the pixels comprises: a substrate 12, a data line 14 disposed on the substrate 12, a scan line 16 disposed on the substrate 12, a common electrode line 18 disposed on the substrate 12, a 2D/3D switching control signal line 19 disposed on the substrate 12, and a pixel unit 20. The pixel unit 20 includes: a first switching element 21, a second switching element 22, a third switching element 23, a fourth switching elements 24, a first pixel electrode 26, and a second pixel electrode 28 disposed in parallel with the first pixel electrode 26.

The first switching element 21 electrically connects to the scan line 16, the data line 14, the second switching element 22, and the second pixel electrode 28 respectively. The second switching element 22 electrically connects to the scan line 16, the first switching element 21, the first pixel electrode 26, the second pixel electrode 28, and the third switching element 23 respectively. The third switching element 23 electrically connects to the scan line 16, the second switching element 22, the first pixel electrode 26, the fourth switching element 24, and a common electrode line 18 respectively. The fourth switching element 24 electrically connects to the 2D/3D switching control signal line 19, the second pixel electrode 28, the third switching element 23, and the common electrode line 18 respectively.

With the above structure, the present invention can achieve being compatible with the 2D display mode and the two different 3D display modes, and every display mode has effect for improving the color shift at the large viewing angle.

Specifically, the first switching element 21 has a first control terminal, a first input terminal and a first output terminal. The first control terminal electrically connects to the scan line 16. The first input terminal electrically connects to the data line 14. The first output terminal electrically connects to the second switching element 22 and the second pixel electrode 28 respectively. The second switching element 22 has a second control terminal, a second input terminal and a second output terminal. The second control terminal 16 electrically connects to the scan line 16. The second input terminal electrically connects to the first output terminal and the second pixel electrode 28 respectively. The second output terminal electrically connects the second output terminal and the first pixel electrode 26, and the third switching element 23 respectively. The third switching element 23 has a third control terminal, a third input terminal and a third output terminal. The third control terminal electrically connects to the scan line 16. The third input terminal electrically connects to the second output terminal and the first pixel electrode 26 respectively. The third output terminal electrically connected to the fourth switching element 24 and the common electrode line 18 respectively. The fourth switching element 24 has a fourth control terminal, a fourth input terminal and a fourth output terminal. The fourth control terminal electrically connects to the 2D/3D switching control signal line 19. The fourth input terminal electrically connects the second pixel electrode 28. The fourth output terminal electrically connects to the third output terminal and the common electrode line 18 respectively.

In the present embodiment, the first to the fourth switching elements 21,22,23,24 are respectively a first to fourth thin-film transistor. The first thin film transistor has a first gate electrode, a first source electrode and a first drain electrode. The second thin film transistor has a second gate electrode, a second source electrode and a second drain electrode. The third thin film transistor has a third gate electrode, a third source electrode and a third drain electrode. The fourth thin film transistor has a fourth gate electrode, a fourth source electrode and a fourth drain electrode. The first to fourth control terminals are respectively the first to the fourth gate electrodes; the first to the fourth input terminals are respectively the first to the fourth source electrodes; the first to the fourth output terminal are respectively the first to the fourth drain electrodes.

The LCD panel compatible with the 2D and 3D display mode utilizes an 8-domains design to improve the color shift issue at the large viewing angle. At the first pixel electrode 26, it forms a first display region of the pixel, and at the second pixel electrode 28, it forms a second display region of the pixel.

Figure 2:
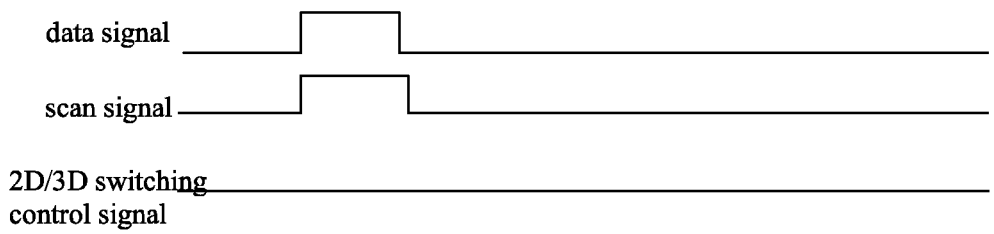
FIG. 2 is a timing diagram for driving signals of a data line, a scan line, and a 2D/3D switching control signal line when an operation mode of an LCD panel compatible with a 2D and a 3D display mode is under the 2D display mode.

With reference to FIG. 2, when operation mode of the LCD panel compatible with the 2D and 3D display mode is under the 2D display mode, the refresh rate of the LCD panel compatible with the 2D and 3D display mode is 60 HZ to improve the color shift issue at large viewing angle of the LCD panel. A signal on the 2D/3D switching control signal line 19 is constantly a low voltage. The fourth switching element 24 is turned off, and the second pixel electrode 28 works normally to display an image.

Figure 3:
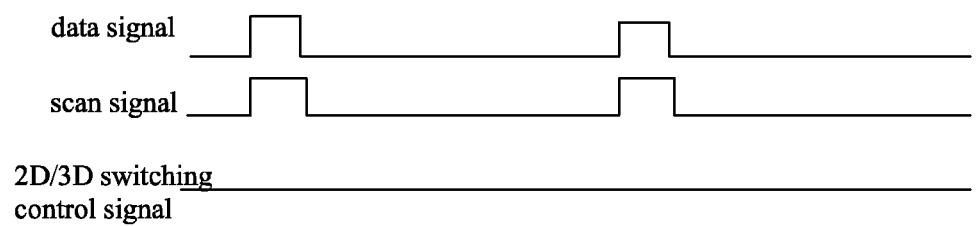
FIG. 3 is a timing diagram for driving signals of a data line, a scan line, and a 2D/3D switching control signal line when an operation mode of an LCD panel compatible with a 2D and a 3D display mode is under a shutter 3D display mode.

With reference to FIG. 3, when the operation mode of the LCD panel compatible with the 2D and 3D display mode is under a shutter 3D display mode, the refresh rate of the LCD panel compatible with the 2D and 3D display mode is 120 HZ to improve the color shift issue at large viewing angle of the LCD panel. Each of the pixels 10 alternately displays frame data of the left and right eye to form a 3D display effect. A signal of the 2D/3D switching control signal 19 is constantly a low voltage. The fourth switching element 24 is turned off, and the second pixel electrode 28 work normally to display an image.

Figure 4:
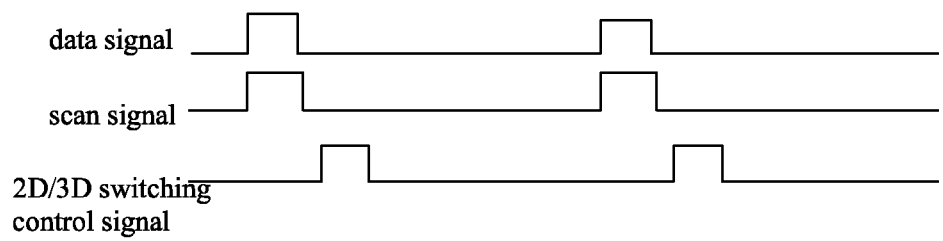
FIG. 4 is a timing diagram for driving signals of a data line, a scan line, and a 2D/3D switching control signal line when an operation mode of an LCD panel compatible with a 2D and a 3D display mode is under a polarized 3D display mode.
Figure 5:
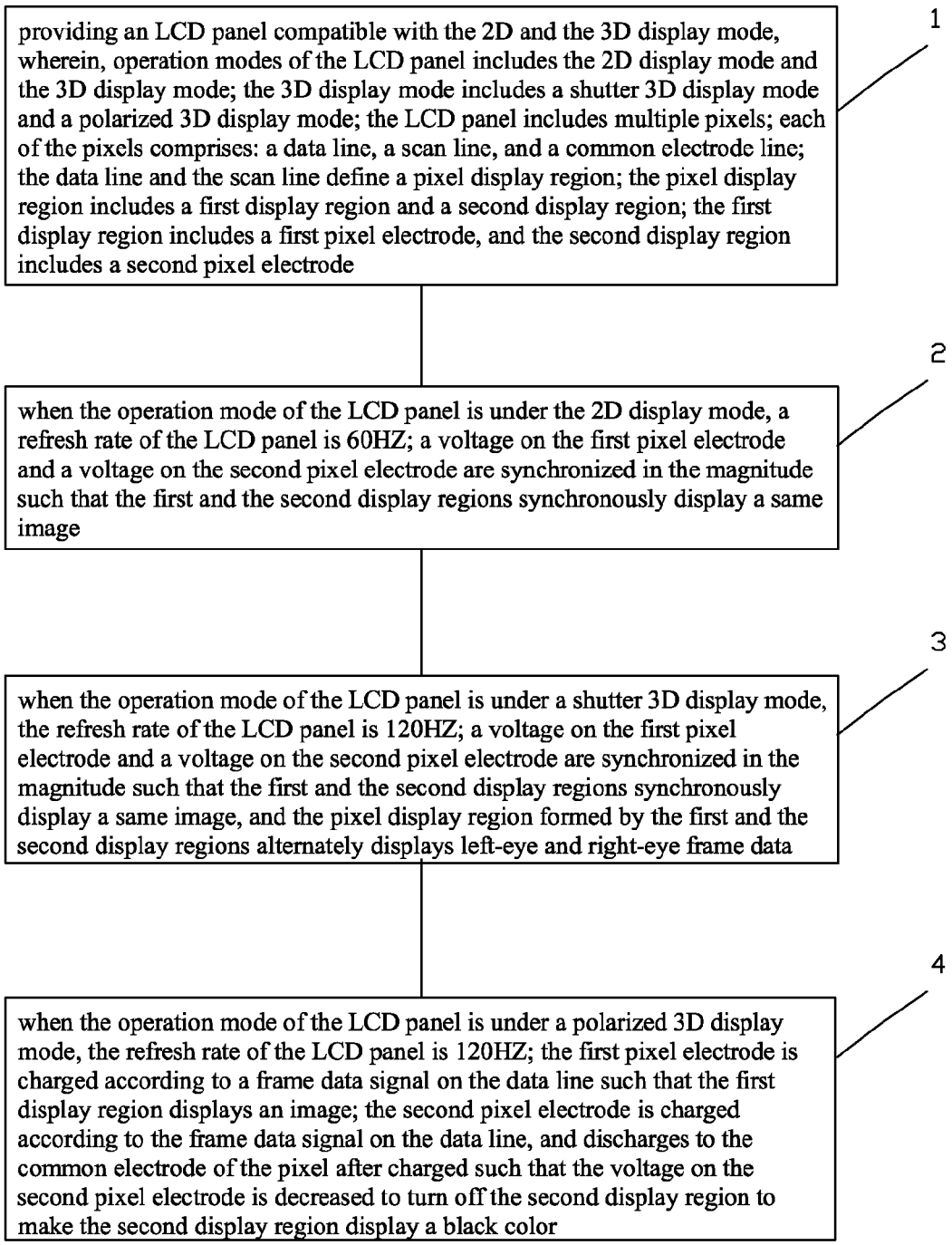
FIG. 5 is a flowchart of a display method compatible with a 2D and a 3D display mode.

With reference to FIG. 4, when the operation mode of the LCD panel compatible with the 2D and 3D display mode is under a polarized 3D display mode, the refresh rate of the LCD panel compatible with the 2D and the 3D display mode is 120 HZ. A signal on the 2D/3D switching control signal line 19 is a square wave with a high and low voltage such that the fourth switching element 24 pulls down a voltage on the second pixel electrode 28 such that after the second pixel electrode 28 is charged, it discharges rapidly. Therefore, the liquid crystal at the second display region maintains the original state, and the second display region display a black color to provide a mask function.

That is, the second display region is turned off, and the first display region uses a refresh rate of 120 HZ to display a picture, and an odd frame and an even frame respectively displays 4 domains of the pixel with 8 domains.

Because under the polarized 3D display mode, it is only displayed at the first display region so that it uses a superposition of time domain way to achieve a large viewing angle, two frames to realize original one frame image, that is, the image signals of an odd frame and an even frame correspond to the same frame respectively provides with two voltages with different magnitude such that it improves the color shift issue at large viewing angle in the 3D display mode through time domain superposition, which has color shift improvement effect at large viewing angle.

Moreover, in the polarized 3D display mode, by displaying the second display region as a black color, it provides a mask function without disposing a black matrix between pixels of two adjacent rows to avoid generating the crosstalk by two eyes image signal so as to reduce the development cost.

It is worth mentioning: the LCD panel compatible with the 2D and 3D display mode provided by the present invention not only utilizes the method for dividing into the first and second display regions, but also dividing a pixel into three or more display regions. Through one or more fourth switching element to control one or more display regions in the polarized 3D display mode to be turned off, it can determine the interval of display region.

With reference to FIG. 1 to FIG. 5, the present invention provides a display method compatible with a 2D and a 3D display mode, comprising steps of:

Step 1, providing a LCD panel compatible with 2D and 3D display mode, and the operation mode of the LCD panel includes the 2D display mode and the 3D display mode. The 3D display mode includes a shutter 3D display mode and a polarized 3D display mode. The LCD panel includes multiple pixels 10, each of the pixels 10 comprises: a data line 14, a scan line 16, a common electrode line 18. The data line 14 and the scan line 16 define a pixel display region. The pixel display region includes a first display region and a second display region. The first display region includes a first pixel electrode 26. The second display region includes a second pixel electrode 28.

Each of the pixels further comprises: a substrate 12, a 2D/3D switching control signal line 19 disposed on the substrate 12, and a pixel unit 20. The data line 14, the scan line 16 and the common electrode lines 18 are all disposed on the substrate 12. The pixel unit 20 includes: a first switching element 21, a second switching element 22, a third switching element 23, a fourth switching element 24, a first pixel electrode 26, and a second pixel electrode 28 disposed in parallel with the first pixel electrode 26.

The first switching element 21 electrically connects to the scan line 16, the data line 14, the second switching element 22, and the second pixel electrode 28 respectively. The second switching element 22 electrically connects to the scan line 16, the first switching element 21, the first pixel electrode 26, the second pixel electrode 28, and the third switching element 23 respectively. The third switching element 23 electrically connects to the scan line 16, the second switching element 22, the first pixel electrode 26, the fourth switching element 24, and a common electrode line 18 respectively. The fourth switching element 23 electrically connects to the 2D/3D switching control signal line 19, the second pixel electrode 28, the third switching element 23, and the common electrode line 18 respectively.

The first switching element 21 has a first control terminal, a first input terminal and a first output terminal and the first control terminal electrically connects to the scan line 16. The first input terminal electrically connects to the data line 14. The first output terminal electrically connects to the second switching element 22 and the second pixel electrode 28 respectively. The second switching element 22 has a second control terminal, a second input terminal and a second output terminal. The second control terminal 16 electrically connects to the scan line 16. The second input terminal electrically connects to the first output terminal and the second pixel electrode 28 respectively. The second output terminal electrically connects the second output terminal and the first pixel electrode 26, and the third switching element 23 respectively. The third switching element 23 has a third control terminal, a third input terminal and a third output terminal. The third control terminal electrically connects to the scan line 16. The third input terminal electrically connects to the second output terminal and the first pixel electrode 26 respectively. The third output terminal electrically connected to the fourth switching element 24 and the common electrode line 18 respectively. The fourth switching element 24 has a fourth control terminal, a fourth input terminal and a fourth output terminal. The fourth control terminal electrically connects to the 2D/3D switching control signal line 19. The fourth input terminal electrically connects the second pixel electrode 28. The fourth output terminal electrically connects to the third output terminal, the common electrode line 18 respectively.

In the present embodiment, the first to the fourth switching elements 21,22,23,24 are respectively a first to a fourth thin-film transistor. The first thin film transistor has a first gate electrode, a first source electrode and a first drain electrode. The second thin film transistor has a second gate electrode, a second source electrode and a second drain electrode. The third thin film transistor has a third gate electrode, a third source electrode and a third drain electrode. The fourth thin film transistor has a fourth gate electrode, a fourth source electrode and a fourth drain electrode. The first to fourth control terminals are respectively the first to the fourth gate electrodes; the first to the fourth input terminals are respectively the first to the fourth source electrodes; the first to the fourth output terminals are respectively the first to the fourth drain electrodes.

The LCD panel compatible with the 2D and 3D display mode utilizes an 8-domains design to improve the color shift issue at the large viewing angle.

Step 2, when the operation mode of the LCD panel is under the 2D display mode, a refresh rate of the LCD panel is 60 HZ, a voltage on the first pixel electrode 26 and a voltage on the second pixel electrode 28 is synchronized in the magnitude, so that the first and second display regions synchronously display a same image.

In this step, a signal on the 2D/3D switching control signal 19 is constantly a low voltage. The fourth switching element 24 is turned off, and the second pixel electrode 28 work normally to display an image at the second display region.

Step 3, when the operation mode of the LCD panel is under a shutter 3D display mode, a refresh rate of the LCD panel is 120 HZ. A voltage on the first pixel electrode 26 and a voltage on the second pixel electrode 28 are synchronized in the magnitude, such that the first and the second display regions synchronously display a same image, and alternately display frame data of left and right eye by the pixel display regions formed by the first and the second display regions.

In this step, each of the pixels 10 alternately displays frame data of left and right eye to form a 3D display effect. A signal on the 2D/3D switching control signal line 19 is constantly a low voltage. The fourth switching element 24 is turned off, and the second pixel electrode 28 work normally to display an image.

Step 4, when the operation mode of the LCD panel is under a polarized 3D display mode, a refresh rate of the LCD panel is 120 HZ. The first pixel electrode 26 is charged according to the frame data signal on the data line 14 such that the first display region displays an image. The second pixel electrode 28 is charged according to the frame data signal on the data line 14, and discharges to the common electrode 18 of the pixel 10 after charged so that it decreases the voltage on the second pixel electrode 28 to turn off the second display region. Therefore, the second display region displays a black color.

In this step, a signal on the 2D/3D switching control signal line 19 is a square wave with a high and low voltage such that the fourth switching element 24 pulls down a voltage on the second pixel electrode 28 such that after the second pixel electrode 28 is charged, it discharges rapidly. Therefore, the liquid crystal at the second display region maintains the original state, and the second display region displays a black color to provide a mask function.

That is, the second display region is turned off, and the first display region uses a refresh rate of 120 HZ to display a picture, and an odd frame and an even frame respectively shows 4 domains of the pixel with 8 domains.

Because under the polarized 3D display mode, it is only displayed at the first display region so that it uses a superposition of time domain way to achieve a large viewing angle, two frames to realize an original image display with one frame, that is, the image signals of an odd frame and an even frame correspond to the same frame respectively provides with two voltages with different magnitude such that it improves the color shift issue at large viewing angle in the 3D display mode through time domain superposition, which has color shift improvement effect at large viewing angle.

Moreover, in the polarized 3D display mode, by displaying the second display region as a black color, it provides the mask function without disposing a black matrix between pixels of two adjacent rows to avoid generating the crosstalk by two eyes image signal so as to reduce the development costs.

With the above display method, the present invention can achieve being compatible with the 2D display mode and two different 3D display modes, and every display mode has effect for improving the color shift in the large viewing angle to reduce the development cost.

It is worth mentioning: the LCD panel compatible with the 2D and 3D display mode provided by the present invention not only utilizes the method for dividing into the first and second display region, but also dividing a pixel into three or more display regions. Through one or more fourth switching element to control one or more display regions in the polarized 3D display mode to be turned off, it can determine the interval of display region.

In summary, the LCD panel and display method compatible with the 2D and 3D display mode of the present invention, through disposing a 2D/3D switching control signal line, and using the high and low voltage on that line to achieve switching of every operation mode. Therefore the present invention can be compatible with the 2D display mode, the shutter 3D display mode, and the polarized 3D display mode. Moreover, the LCD panel compatible with the 2D and 3D display modes utilizes an 8-domains design to improve the color shift issue at the large viewing angle, which has the color shift improvement effect at the large viewing angle. At the same time, the present invention can also increase aperture ratio, reduce energy consumption, and reduce development cost.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display (LCD) panel compatible with a 2D and a 3D display mode, operation modes of the LCD panel comprising the 2D display mode and the 3D display mode, the 3D display mode comprising a shutter 3D display mode and a polarized 3D display mode, the LCD panel comprising multiple pixels, each pixel comprising:
    a substrate;
    a data line disposed on the substrate;
    a scan line disposed on the substrate;
    a common electrode line disposed on the substrate;
    a 2D/3D switching control signal line disposed on the substrate; and
    a pixel unit, comprising:
        a first switching element;
        a second switching element;
        a third switching element;
        a fourth switching element;
        a first pixel electrode; and
        a second pixel electrode disposed in parallel with the first pixel electrode,
    wherein, the first switching element electrically connects to the scan line, the data line, the second switching element, and the second pixel electrode respectively; the second switching element electrically connects to the scan line, the first switching element, the first pixel electrode, the second pixel electrode, and the third switching element respectively; the third switching element electrically connects to the scan line, the second switching element, the first pixel electrode, the fourth switching element, and the common electrode line respectively; the fourth switching element electrically connects to the 2D/3D switching control signal line, the second pixel electrode, the third switching element, and the common electrode line respectively.

2. The LCD panel compatible with a 2D and a 3D display mode according to claim 1, wherein,
    when the operation mode of the LCD panel compatible with the 2D and 3D display mode is under the 2D display mode, a refresh rate of the LCD panel compatible with the 2D and 3D display mode is 60 HZ, and a signal on the 2D/3D switching control signal line is constantly a low voltage;

when the operation mode of the LCD panel compatible with the 2D and 3D display mode is under the shutter 3D display mode, the refresh rate of the LCD panel compatible with the 2D and 3D display mode is 120 HZ, and each of the pixels alternately displays a left-eye frame data and a right-eye frame data, and a signal on the 2D/3D switching control signal line is constantly a low voltage;

when the operation mode of the LCD panel compatible with the 2D and 3D display mode is under the polarized 3D display mode, the refresh rate of the LCD panel compatible with the 2D and 3D display mode is 120 HZ, and a signal on the 2D/3D switching control signal line is a square wave with a high and low voltage such that the fourth switching element pulls down a voltage on the second pixel electrode to make a location at the second pixel electrode display a black color to provide a mask function.

3. The LCD panel compatible with a 2D and a 3D display mode according to claim 1, wherein, the first switching element has a first control terminal, a first input terminal and a first output terminal and the first control terminal electrically connects to the scan line, the first input terminal electrically connects to the data line, first output terminal electrically connects to the second switching element and the second pixel electrode respectively;

the second switching element has a second control terminal, a second input terminal and a second output terminal, the second control terminal electrically connects to the scan line, the second input terminal electrically connects to the first output terminal and the second pixel electrode respectively, the second output terminal electrically connects the second output terminal and the first pixel electrode, and the third switching element respectively;

the third switching element has a third control terminal, a third input terminal and a third output terminal, the third control terminal electrically connects to the scan line, the third input terminal electrically connects to the second output terminal and the first pixel electrode respectively, the third output terminal electrically connected to the fourth switching element and the common electrode line respectively;

the fourth switching element has a fourth control terminal, a fourth input terminal and a fourth output terminal, the fourth control terminal electrically connects to the 2D/3D switching control signal line, the fourth input terminal electrically connects the second pixel electrode, the fourth output terminal electrically connects to the third output terminal and the common electrode line respectively.

4. The LCD panel compatible with a 2D and a 3D display mode according to claim 3, wherein, the first to the fourth switching elements are respectively a first to a fourth thin-film transistors; the first thin film transistor has a first gate electrode, a first source electrode and a first drain electrode; the second thin-film transistor has a second gate electrode, a second source electrode and a second drain electrode; the third thin film transistor has a third gate electrode, a third source electrode and a third drain electrode; the fourth thin film transistor has a fourth gate electrode, a fourth source electrode and a fourth drain electrode; the first to the fourth control terminals are respectively the first to the fourth gate electrodes; the first to the fourth input terminals are respectively the first to the fourth source electrodes; the first to the fourth output terminal are respectively the first to the fourth drain electrodes.

5. The LCD panel compatible with a 2D and a 3D display mode according to claim 1, wherein, the LCD panel compatible with the 2D and the 3D display mode utilizes an 8-domains design.

6. A liquid crystal display (LCD) panel compatible with a 2D and a 3D display mode, operation modes of the LCD panel comprising the 2D display mode and the 3D display mode, the 3D display mode comprising a shutter 3D display mode and a polarized 3D display mode, the LCD panel comprising multiple pixels, each pixel comprising:
a substrate;
a data line disposed on the substrate;
a scan line disposed on the substrate;
a common electrode line disposed on the substrate;
a 2D/3D switching control signal line disposed on the substrate; and
a pixel unit, comprising:
a first switching element;
a second switching element;
a third switching element;
a fourth switching element;
a first pixel electrode; and
a second pixel electrode disposed in parallel with the first pixel electrode,
wherein, the first switching element electrically connects to the scan line, the data line, the second switching element, and the second pixel electrode respectively; the second switching element electrically connects to the scan line, the first switching element, the first pixel electrode, the second pixel electrode, and the third switching element respectively; the third switching element electrically connects to the scan line, the second switching element, the first pixel electrode, the fourth switching element, and the common electrode line respectively; the fourth switching element electrically connects to the 2D/3D switching control signal line, the second pixel electrode, the third switching element, and the common electrode line respectively;

when the operation mode of the LCD panel compatible with the 2D and 3D display mode is under the 2D display mode, a refresh rate of the LCD panel compatible with the 2D and 3D display mode is 60 HZ, and a signal on the 2D/3D switching control signal line is constantly a low voltage;

when the operation mode of the LCD panel compatible with the 2D and 3D display mode is under the shutter 3D display mode, the refresh rate of the LCD panel compatible with the 2D and 3D display mode is 120 HZ, and each of the pixels alternately displays a left-eye frame data and a right-eye frame data, and a signal on the 2D/3D switching control signal line is constantly a low voltage;

when the operation mode of the LCD panel compatible with the 2D and 3D display mode is under the polarized 3D display mode, the refresh rate of the LCD panel compatible with the 2D and 3D display mode is 120 HZ, and a signal on the 2D/3D switching control signal line is a square wave with a high and low voltage such that the fourth switching element pulls down a voltage on the second pixel electrode to make a location at the second pixel electrode display a black color to provide a mask function.

7. The LCD panel compatible with a 2D and a 3D display mode according to claim 6, wherein, the first switching element has a first control terminal, a first input terminal and a first output terminal and the first control terminal electrically connects to the scan line, the first input terminal electrically connects to the data line, first output terminal electrically connects to the second switching element and the second pixel electrode respectively;

the second switching element has a second control terminal, a second input terminal and a second output terminal, the second control terminal electrically connects to the scan line, the second input terminal electrically connects to the first output terminal and the second pixel electrode respectively, the second output terminal electrically connects the second output terminal and the first pixel electrode, and the third switching element respectively;

the third switching element has a third control terminal, a third input terminal and a third output terminal, the third control terminal electrically connects to the scan line, the third input terminal electrically connects to the second output terminal and the first pixel electrode respectively, the third output terminal electrically connected to the fourth switching element and the common electrode line respectively;

the fourth switching element has a fourth control terminal, a fourth input terminal and a fourth output terminal, the fourth control terminal electrically connects to the 2D/3D switching control signal line, the fourth input terminal electrically connects the second pixel electrode, the fourth output terminal electrically connects to the third output terminal and the common electrode line respectively.

8. The LCD panel compatible with a 2D and a 3D display mode according to claim 7, wherein, the first to the fourth switching elements are respectively a first to a fourth thin-film transistors; the first thin film transistor has a first gate electrode, a first source electrode and a first drain electrode; the second thin-film transistor has a second gate electrode, a second source electrode and a second drain electrode; the third thin film transistor has a third gate electrode, a third source electrode and a third drain electrode; the fourth thin film transistor has a fourth gate electrode, a fourth source electrode and a fourth drain electrode; the first to the fourth control terminals are respectively the first to the fourth gate electrodes; the first to the fourth input terminals are respectively the first to the fourth source electrodes; the first to the fourth output terminal are respectively the first to the fourth drain electrodes.

9. The LCD panel compatible with a 2D and a 3D display mode according to claim 6, wherein, the LCD panel compatible with the 2D and the 3D display mode utilizes an 8-domains design.

10. A display method compatible with a 2D and a 3D display mode, comprising steps of:
   step1: providing an LCD panel compatible with the 2D and the 3D display mode, wherein, operation modes of the LCD panel includes the 2D display mode and the 3D display mode; the 3D display mode includes a shutter 3D display mode and a polarized 3D display mode; the LCD panel includes multiple pixels; each of the pixels comprises: a data line, a scan line, and a common electrode line; the data line and the scan line define a pixel display region; the pixel display region includes a first display region and a second display region; the first display region includes a first pixel electrode, and the second display region includes a second pixel electrode;
   step2: when the operation mode of the LCD panel is under the 2D display mode, a refresh rate of the LCD panel is 60 HZ; a voltage on the first pixel electrode and a voltage on the second pixel electrode are synchronized in the magnitude such that the first and the second display regions synchronously display a same image;
   step3: when the operation mode of the LCD panel is under a shutter 3D display mode, the refresh rate of the LCD panel is 120 HZ; a voltage on the first pixel electrode and a voltage on the second pixel electrode are synchronized in the magnitude such that the first and the second display regions synchronously display a same image, and the pixel display region formed by the first and the second display regions alternately displays left-eye and right-eye frame data;
   step4: when the operation mode of the LCD panel is under a polarized 3D display mode, the refresh rate of the LCD panel is 120 HZ; the first pixel electrode is charged according to a frame data signal on the data line such that the first display region displays an image; the second pixel electrode is charged according to the frame data signal on the data line, and discharges to the common electrode of the pixel after charged such that the voltage on the second pixel electrode is decreased to turn off the second display region to make the second display region display a black color.

11. The display method compatible with a 2D and a 3D display mode according to claim 10, wherein, each of the pixels further comprises: a substrate, a 2D/3D switching control signal line disposed on the substrate, and a pixel unit; the data line, the scan line and the common electrode line are all disposed on the substrate; the pixel unit includes: a first, a second, a third, a fourth switching elements, a first pixel electrode, and a second pixel electrode disposed in parallel with the first pixel electrode; the first switching element electrically connects to the scan line, the data line, the second switching element, and the second pixel electrode respectively; the second switching element electrically connects to the scan line, the first switching element, the first pixel electrode, the second pixel electrode, and the third switching element respectively; the third switching element electrically connects to the scan line, the second switching element, the first pixel electrode, the fourth switching element, and a common electrode line respectively; the fourth switching element electrically connects to the 2D/3D switching control signal line, the second pixel electrode, the third switching element, and the common electrode line respectively;

the first switching element has a first control terminal, a first input terminal and a first output terminal and the first control terminal electrically connects to the scan line, the first input terminal electrically connects to the data line, first output terminal electrically connects to the second switching element and the second pixel electrode respectively;

the second switching element has a second control terminal, a second input terminal and a second output terminal, the second control terminal electrically connects to the scan line, the second input terminal electrically connects to the first output terminal and the second pixel electrode respectively, the second output terminal electrically connects the second output terminal and the first pixel electrode, and the third switching element respectively;

the third switching element has a third control terminal, a third input terminal and a third output terminal, the third control terminal electrically connects to the scan line, the third input terminal electrically connects to the second output terminal and the first pixel electrode respectively, the third output terminal electrically connected to the fourth switching element and the common electrode line respectively;

the fourth switching element has a fourth control terminal, a fourth input terminal and a fourth output terminal, the fourth control terminal electrically connects to the 2D/3D switching control signal line, the fourth input terminal electrically connects the second pixel electrode, the fourth output terminal electrically connects to the third output terminal and the common electrode line respectively.

12. The display method compatible with a 2D and a 3D display mode according to claim 11, wherein, in the step2, a signal on the 2D/3D switching control signal line is constantly a low voltage;

in the step3, a signal on the 2D/3D switching control signal line is constantly a low voltage; and in the step4, a signal on the 2D/3D switching control signal line is a square wave with a high and low voltage such that after the second pixel electrode is charged, using the high voltage provided by the 2D/3D switching control signal line to turn on the fourth switching element such that the second pixel electrode discharges to the common electrode line, decreases the voltage on the second pixel electrode to turn off the second display region.

13. The display method compatible with a 2D and a 3D display mode according to claim 11, wherein, the first to the fourth switching elements are respectively a first to a fourth thin-film transistors; the first thin film transistor has a first gate electrode, a first source electrode and a first drain electrode; the second thin-film transistor has a second gate electrode, a second source electrode and a second drain electrode; the third thin film transistor has a third gate electrode, a third source electrode and a third drain electrode; the fourth thin film transistor has a fourth gate electrode, a fourth source electrode and a fourth drain electrode; the first to the fourth control terminals are respectively the first to the fourth gate electrodes; the first to the fourth input terminals are respectively the first to the fourth source electrodes; the first to the fourth output terminal are respectively the first to the fourth drain electrodes.

14. The display method compatible with a 2D and a 3D display mode according to claim 10, wherein, the LCD panel compatible with the 2D and the 3D display mode utilizes a 8-domains design.

* * * * *